(12) United States Patent
Hamburgen et al.

(10) Patent No.: US 8,434,924 B1
(45) Date of Patent: May 7, 2013

(54) WHITE LIGHT SOURCE USING TWO COLORED LEDS AND PHOSPHOR

(75) Inventors: William Hamburgen, Palo Alto, CA (US); Ken Foo, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 104 days.

(21) Appl. No.: 13/022,613

(22) Filed: Feb. 7, 2011

Related U.S. Application Data

(60) Provisional application No. 61/415,336, filed on Nov. 18, 2010.

(51) Int. Cl.
*F21V 33/00* (2006.01)

(52) U.S. Cl.
USPC ............ 362/612; 362/84; 362/231

(58) Field of Classification Search ........ 362/84, 362/611, 612, 613, 231
See application file for complete search history.

(56) References Cited

U.S. PATENT DOCUMENTS

| | | | | |
|---|---|---|---|---|
| 7,476,016 | B2 * | 1/2009 | Kurihara | 362/612 |
| 7,695,150 | B2 * | 4/2010 | Dejima et al. | 362/84 |
| 7,834,372 | B2 * | 11/2010 | Zhai et al. | 257/98 |
| 8,002,453 | B2 | 8/2011 | Kuo | |
| 8,022,388 | B2 * | 9/2011 | Brandes | 257/13 |
| 2007/0253218 | A1 | 11/2007 | Tanabe | |
| 2009/0122533 | A1 * | 5/2009 | Brukilacchio | 362/231 |
| 2009/0224652 | A1 * | 9/2009 | Li et al. | 313/498 |
| 2009/0236620 | A1 * | 9/2009 | Park et al. | 257/89 |
| 2011/0030920 | A1 | 2/2011 | Qin et al. | |
| 2011/0080754 | A1 * | 4/2011 | Wang | 362/613 |

OTHER PUBLICATIONS

Final Office Action for U.S. Appl. No. 13/297,037, mailed Apr. 18, 2012, 16 pages.

* cited by examiner

*Primary Examiner* — Laura Tso
(74) *Attorney, Agent, or Firm* — Brake Hughes Bellermann LLP

(57) ABSTRACT

A backlight for providing light to a computer-controlled display device, includes a plurality of first light sources, a plurality of second light sources, and a light guide panel (LGP). The LGP has at least one edge and a surface facing a display surface of the display device and is adapted for guiding light emitted by, and received from, the first and second light sources at one or more edges of the LGP to the surface of the LGP. The first light sources include first light emitting diodes (LEDs) having a peak emission wavelength of greater than 500 nm. The second light sources include second LEDs having a peak emission wavelength of less than 480 nm and phosphor material that absorbs a portion of light emitted from the second LEDs and converts the absorbed light into light emitted from the phosphor material having a peak emission wavelength greater than 500 nm.

26 Claims, 12 Drawing Sheets

WHITE LIGHT SOURCE USING TWO COLORED LEDS AND PHOSPHOR

CROSS REFERENCE TO RELATED APPLICATIONS

This application claims the benefit of U.S. Provisional Application No. 61/415,336, filed Nov. 18, 2010, and titled "BACKLIT DISPLAYS," which is hereby incorporated by reference in its entirety.

TECHNICAL FIELD

This description relates light emitting diode (LED) sources of white light and, in particular, to white light source using two colored LEDs and a phosphor material.

BACKGROUND

Light emitting diodes (LEDs) provide a relatively efficient and inexpensive source of light. However, LEDs generally produce light over only a narrow range of visible wavelengths. Thus, to produce white light, the light from multiple LEDs that produce different wavelengths of light can be combined, such that the combination of outputs appears white to a person. Alternatively, the generally-monochromatic light output from an LED can used to pump another light source (e.g., a phosphor material) that absorbs the narrowband light from the LED and emits another, typically broader, spectrum of light, such that the combined spectrum of the LED and the other light source can appear white to a person. The color of light emitted by the LED and the color of light emitted by the pumped light source generally are complementary to each other, so that when the two colors mixed white light results. For example, the blue LED may be used to pump a light source (e.g., a phosphor material) that emits yellow light, because blue and yellow are complementary colors.

LEDs that are used to produce white light can be used to provide backlighting for a liquid crystal display (LCD) device.

SUMMARY

In a first general aspect, a backlight for providing light to a computer-controlled display device, includes a plurality of first light sources, a plurality of second light sources, and a light guide panel (LGP). The LGP has at least one edge and a surface facing a display surface of the display device and is adapted for guiding light emitted by, and received from, the first and second light sources at one or more edges of the LGP to the surface of the LGP. The first light sources include first light emitting diodes (LEDs) having a peak emission wavelength of greater than 500 nm. The second light sources include second LEDs having a peak emission wavelength of less than 480 nm and phosphor material that absorbs a portion of light emitted from the second LEDs and converts the absorbed light into light emitted from the phosphor material having a peak emission wavelength greater than 500 nm.

Implementations include one or more of the following features. For example, the light received from the first light sources at an edge of the LGP can have a full-width, half-maximum spectral bandwidth of less than about 25 nm, and the light received from the second light sources at an edge of the LGP can have a full-width, half-maximum spectral bandwidth of greater than about 70 nm. The first LEDs can have a peak emission wavelength of greater than 610 nm, and the phosphor material can absorb a portion of light emitted from the second LEDs and convert the absorbed light into light emitted from the phosphor material having a peak emission wavelength of between 500 nm and 570 nm. The first LEDs can have a peak emission wavelength of between 500 nm and 570 nm, and the phosphor material can absorb a portion of light emitted from the second LEDs and convert the absorbed light into light emitted from the phosphor material having a peak emission wavelength of greater than 610 nm.

The first light sources can include first LEDs having a first peak emission wavelength of between 500 nm and 570 nm and further include a phosphor material that absorbs a portion of light emitted from the first LEDs and converts the absorbed light into light emitted from the phosphor material having a second peak emission wavelength of between 570 nm and 590 nm, and the second light sources can include second LEDs having a peak emission wavelength of less than 480 nm and phosphor material that absorbs a portion of light emitted from the second LEDs and converts the absorbed light into light emitted from the phosphor material having a peak emission wavelength of greater than 610 nm.

The first light sources can include first LEDs having a first peak emission wavelength of between 500 nm and 570 nm and can further include a phosphor material that absorbs a portion of light emitted from the first LEDs and converts the absorbed light into light emitted from the phosphor material having a second peak emission wavelength of greater than 610 nm. The second light sources can include second LEDs having a peak emission wavelength of less than 480 nm and phosphor material that absorbs a portion of light emitted from the second LEDs and converts the absorbed light into light emitted from the phosphor material having a peak emission wavelength of between 570 nm and 590 nm.

The first light sources can include first LEDs having a first peak emission wavelength of between 570 nm and 590 nm and can further include a phosphor material that absorbs a portion of light emitted from the first LEDs and converts the absorbed light into light emitted from the phosphor material having a second peak emission wavelength of greater than 610 nm. The second light sources can include second LEDs having a peak emission wavelength of less than 480 nm and phosphor material that absorbs a portion of light emitted from the second LEDs and converts the absorbed light into light emitted from the phosphor material having a peak emission wavelength of between 500 nm and 570 nm.

The first and second light sources can be located proximate to at least one edge of the light guide panel. The second LEDs can be at least partially encapsulated by the phosphor material. At least one first light source can be co-packaged with at least one second light source. The light guide panel can include at least some of the phosphor material that absorbs light emitted from the second LEDs and converts the absorbed light into the light emitted from the phosphor material having a peak emission wavelength greater than 500 nm.

The backlight can further include a printed circuit board having a surface upon which a plurality of the first light sources are disposed and upon which a plurality of the second light sources are disposed, where individual ones of the plurality of first light sources are disposed between individual ones of the plurality of second light sources. The backlight can further include a first printed circuit board having a first surface upon which a plurality of the first light sources are disposed and a second printed circuit board having a second surface upon which a plurality of the second light sources are disposed, where the first surface and the second surface face each other, and where individual ones of the plurality of first light sources are disposed between individual ones of the plurality of second light sources.

The first light sources can be located at a first edge of the light guide panel and the second light sources can be located at a second edge of the light guide panel, opposite the first edge, where the first light sources emit light in a direction toward the second light sources and the second light sources emit light toward the first light sources.

The light received from the first LEDs at the edge of the LGP can have a FWHM bandwidth of less than about 40 nm, and the light received from the second LEDs light sources at the edge of the LGP, which is not absorbed by the phosphor material, can have a FWHM bandwidth of less than about 40 nm. The light received from the second LEDs light sources at the edge of the LGP, which is absorbed by the phosphor material and converted into light emitted from the phosphor material, can have a FWHM bandwidth of greater than about than about 80 nm.

In another general aspect, a backlight for providing light to a computer-controlled display device includes a plurality of first light sources, a plurality of second light sources, and a light guide panel (LGP) having at least one edge and a surface facing a display surface of the display device. The LGP is adapted for guiding light emitted by, and received from, the first and second light sources at one or more edges of the LGP to the surface of the LGP, The first light sources include first light emitting diodes (LEDs) having a peak emission wavelength of less than 480 nm and phosphor material that absorbs a portion of light emitted from the first LEDs and converts the absorbed light into light emitted from the phosphor material having a peak emission wavelength of between 500 nm and 570 nm. The second light sources include second LEDs having a peak emission wavelength of less than 480 nm and phosphor material that absorbs a portion of light emitted from the second LEDs and converts the absorbed light into light emitted from the phosphor material having a peak emission wavelength greater than 610 nm.

Implementations include one or more of the following features. For example, the first and second light sources can be located proximate to at least one edge of the light guide panel. At least one first light source can be co-packaged with at least one second light source. The light guide panel can include at least some of the phosphor material that absorbs light emitted from the second LEDs and can convert the absorbed light into the light emitted from the phosphor material having a peak emission wavelength greater than 610 nm. The backlight can further include a printed circuit board having a surface upon which a plurality of the first light sources are disposed and upon which a plurality of the second light sources are disposed, where individual ones of the plurality of first light sources are disposed between individual ones of the plurality of second light sources. The backlight can further include a first printed circuit board having a first surface upon which a plurality of the first light sources are disposed and a second printed circuit board having a second surface upon which a plurality of the second light sources are disposed, where the first surface and the second surface face each other, and where individual ones of the plurality of first light sources are disposed between individual ones of the plurality of second light sources. The first light sources can be located at a first edge of the light guide panel and the second light sources can be located at a second edge of the light guide panel, opposite the first edge, where the first light sources emit light in a direction toward the second light sources and the second light sources emit light toward the first light sources.

In another general aspect, a backlight for providing light to a computer-controlled display device can include a plurality of first light sources, a a plurality of second light sources, and a light guide panel (LGP) having at least a first surface facing a display surface of the display device and a back surface opposite the first surface. The LGP is adapted for guiding light emitted by, and received from, the first and second light sources at the back surface of the LGP to the first surface of the LGP. The first light sources include first light emitting diodes (LEDs) having a peak emission wavelength of greater than 500 nm, and the second light sources include second LEDs having a peak emission wavelength of less than 480 nm and phosphor material that absorbs a portion of light emitted from the second LEDs and converts the absorbed light into light emitted from the phosphor material having a peak emission wavelength greater than 500 nm.

In another general aspect, a backlight for providing light to a computer-controlled display device includes a plurality of first light sources, a plurality of second light sources, and a light guide panel (LGP) having at least one edge and a surface facing a display surface of the display device, where the LGP is adapted for guiding light emitted by, and received from, the first and second light sources at one or more edges of the LGP to the surface of the LGP. The first light sources include first light emitting diodes (LEDs) having a peak emission wavelength of greater than 500 nm, and the second light sources include second LEDs having a peak emission wavelength of less than 480 nm and pumped light source that absorbs a portion of light emitted from the second LEDs and converts the absorbed light into light emitted from the pumped light source having a peak emission wavelength greater than 500 nm.

Implementations include one or more of the following features. For example, the pumped light source can include a phosphor material or it can include a quantum dot material. The first LEDs can have a peak emission wavelength of greater than 610 nm, and the quantum dot material can absorb a portion of light emitted from the second LEDs and converts the absorbed light into light emitted from the phosphor material having a peak emission wavelength of between 500 nm and 570 nm. The FWHM bandwidth of the pumped light source that includes the quantum dot material can be less than 40 nm.

DETAILED DESCRIPTION

Liquid crystal display (LCD) devices are used in a variety of applications, such as in televisions, computer monitor display devices, tablet display devices, mobile phone and smart phone displays. They are energy efficient when compared with other types of displays, and they can be thinner than many other types of displays. Most LCDs include a layer of liquid crystal molecules aligned between two transparent electrodes, and two polarizing filters whose axis of transmission are perpendicular to each other. A source of light is provided to the LCD, and the amount of light that passes through the LCD can be controlled by controlling an electric field between the two transparent electrodes, which, in turn, controls the orientation of the liquid crystal molecules and therefore the amount of light that passes through the LCD.

An LCD device can include many individually-controllable pixel elements. By controlling the amount of light that is transmitted through each element an image can be defined by the LCD device. In addition, the pixel elements may include multiple different color filters, where the amount of white light passing through each filter can be individually-controlled, so that the LDC device can render a color image.

Figure 1:
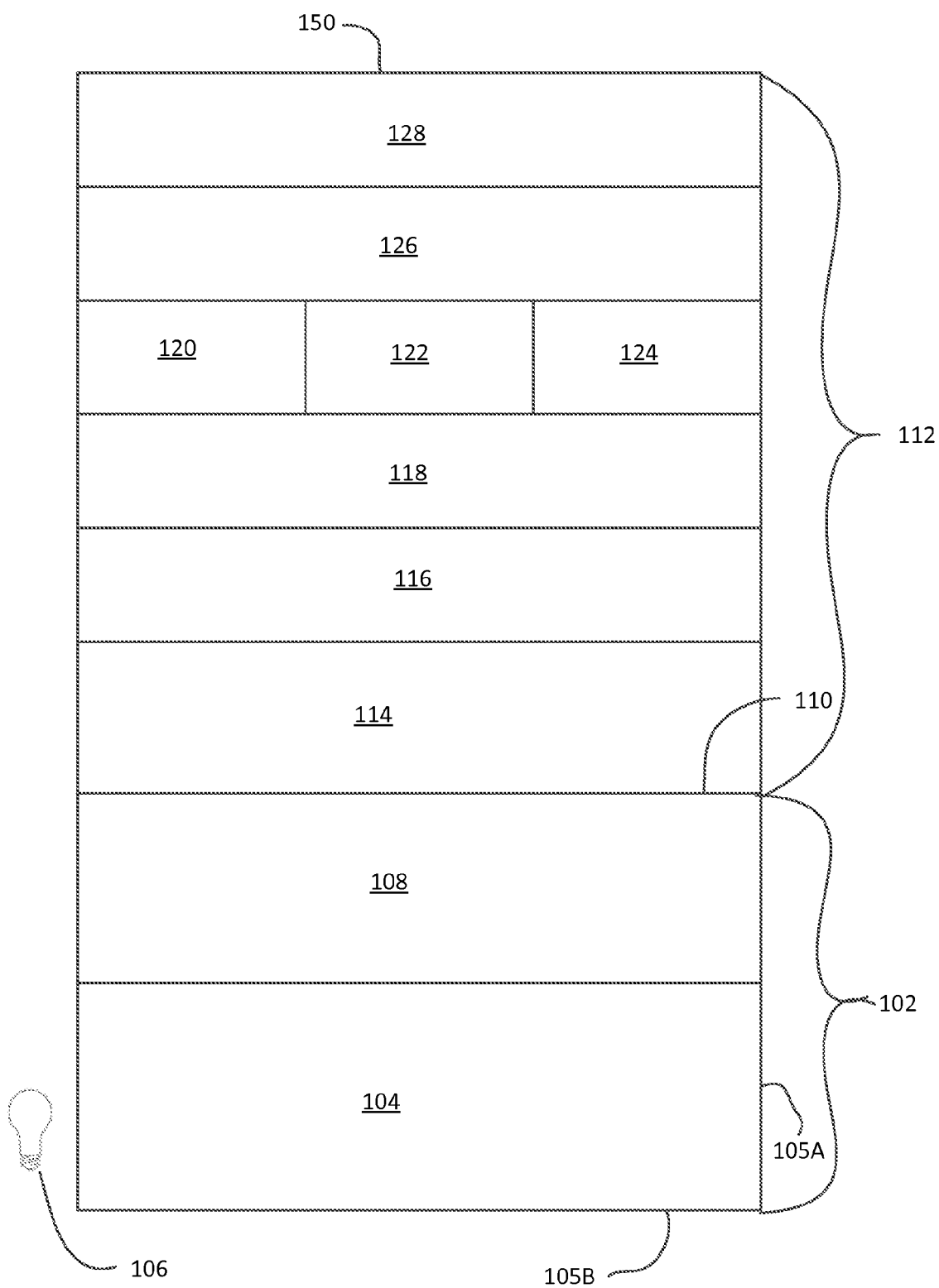
FIG. 1 is an example cross-sectional schematic diagram of a pixel element of a liquid crystal display.

FIG. 1 is an example cross-sectional schematic diagram of pixel element of an LCD device 100. The pixel element can include backlight section 102 and an LCD section 112. The backlight section 102, can include a transparent light guide panel (LGP) 104 that can include glass, plastic, polymer, etc. material, which can transmit light from a edge- or rear-mounted light source 106. In the example implementation shown in FIG. 1, the light source 106 is edge-mounted, in that the light source is mounted proximate to an edge of the LGP 106, so that the light from the source 106 is coupled into the LGP 104 through an edge of the LGP and can traverse the LGP to a side surface LGP which can include a reflecting surface to re-inject light into the LGP 104. Light can also strike a bottom surface 105B of the LGP, where the bottom surface 105B can include a reflecting surface to re-direct light into the LGP 104. In a example back-lit implementation (not shown), the light source 106 can be mounted proximate to the bottom surface 105B of the LGP 104 and coupled through the bottom surface into the LGP. In the backlit implementation both side surfaces of the LGP can include reflecting surfaces to redirect light into the LGP 104.

The LGP 104 is coupled to a diffuser 108 that extracts light from the LGP and directs the light toward the display surface 150 of the LCD pixel element 100. The interface surface 110 of the LGP 104 and the diffuser 108 can be roughened, pitted, dimpled, etc., where the surface features are defined on a scale that is selected to scatter light in the LGP 104 out of the LGP and into the diffuser 108. The bottom surface 105B of the LGP 104 also can be similarly roughened, pitted, dimpled, etc., to scatter light in the LGP 104 out of the LGP and into the diffuser 108. The diffuser 108 includes transparent material that transmits light to the LCD section 112. The diffuser 108 can include a multi-layered optical film stack that includes a diffusing layer, prisms and other optical elements that control the light to create a substantially homogeneous intensity profile over the display surface 150 of the pixel element 100.

The LCD section 112 can include a rear polarizer 114, an addressing structure 116 that may include thin film transistors (TFTs) disposed on a transparent plate, a liquid crystal material layer 118, color filters (e.g., red, green, and blue filters) 120, 122, 124 on a transparent plate, a front polarizer 126, and a protective glass layer 128.

As light traverses, and reflects within, the LGP 104, it can be scattered from the interface 110 of the LGP 104 and the diffuser 108, such that light enters the diffuser and propagates upward though the pixel element 100. Light that passes through the diffuser is polarized by the rear polarizer 114 and then enters the liquid crystal material layer 118. The TFTs in the addressing structure 116 control the amount of charge between different regions of the addressing structure 116 and the color filters 120, 122, 124, and the amount of charge determines the degree to which long molecules in the liquid crystal material layer 116 are oriented in such a manner as to act as a selective polarization region that, in conjunction with rear polarizer 114 prevents light from reaching one or more of the color filters 120, 122, 124. In this way, the amount of light that is allowed to pass into the individual color filters 120, 122, 124 is controlled. The color filters 120, 122, 124 filter the light passing though them, and the light is then repolarized by the front polarizer 126 and passes though the cover glass 128 of the display.

The light source 106 can include one or more LEDs that emit white light. White LEDs can be LEDs that natively emit light primarily in the blue end of the color spectrum but which are coated with a phosphor material, such that the light emitted from the coated LED is a broad-spectrum white color. In another implementation, the light source 106 can include multiple LEDs that emit light at different wavelengths (e.g., red, green, and blue). When the size of pixel elements is made smaller and smaller in an effort to increase the resolution of the display, i.e., to increase the number of pixels per square inch on the display, then less light from the source 106 is available for each pixel element. Thus, increasing the intensity of the light from the source 106, increasing the amount of light that is coupled from the source 106 into the LGP 104, and increasing the amount of light that is coupled from the LGP 104, through the diffuser 108, and into the color filters 120, 122, 124 is desirable.

Figure 2:
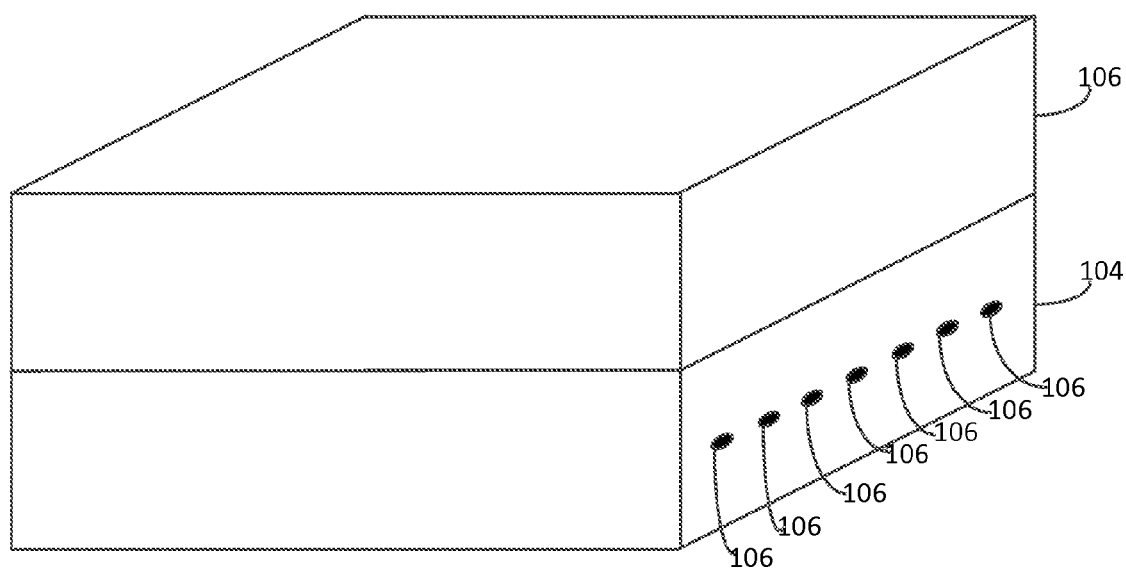
FIG. 2 is a schematic perspective view of a light guide panel and a diffuser.

FIG. 2 is a schematic perspective view of the LGP 104 and the diffuser 108. Multiple light sources 106 are positioned at an edge of the LGP 104, so that light emitted from the sources enters the LGP. As the light propagates through the LGP 104, most of the light is coupled upward into the diffuser 108, so that it can be used to illuminate the LCD portion 112 of the device. The multiple light sources can be mounted on one or more printed circuit boards (PCB), as discussed below.

In some implementations, the light sources 106 that produce white light can include multiple LEDs that emit different colors of light, which, when combined, produce white light. More particularly, the combined outputs of the multiple LEDs that emit different colors of light can have an x,y chromaticity coordinate that is close to the chromaticity coordinate of the white point of a standard red, green, blue color space. For example, the CIE1931 x,y chromaticity coordinate of the combined output of the different LEDs can be x=0.26–0.32 and y=0.28–0.34.

Figure 3:
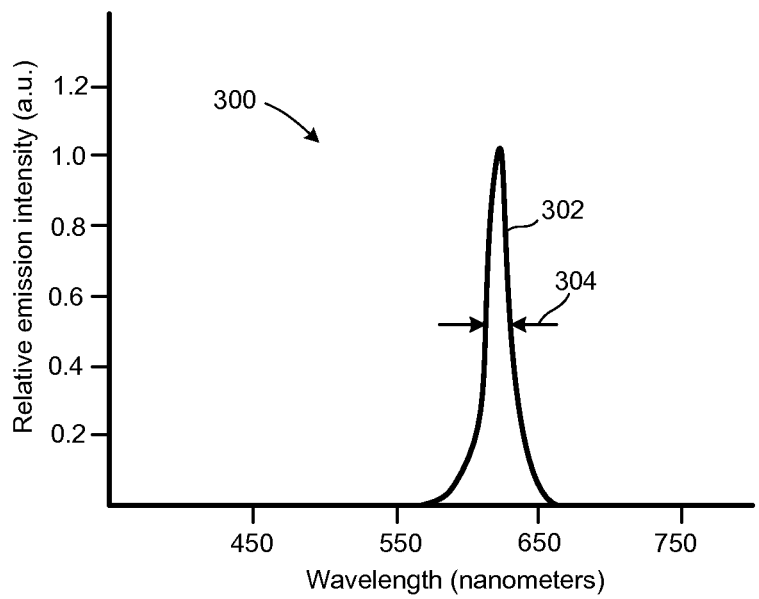
FIG. 3 is a schematic diagram of a spectrum of light emitted from a light source that includes an LED.
Figure 4:
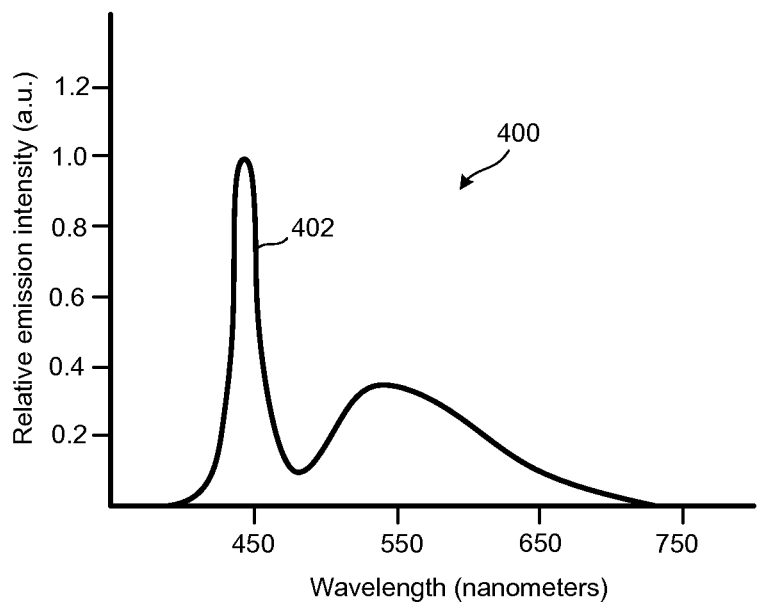
FIG. 4 is a schematic diagram of a spectrum of light emitted from a light source that includes an LED and a phosphor material.

FIG. 3 is a schematic diagram of a spectrum of light 300 emitted from a light source that includes an LED. The spectrum is represented by a curve 302 showing the relative emission intensity of light as a function of wavelength of the emitted light. In the example shown in FIG. 3 the spectrum 302 has a peak emission wavelength of about 630 nm, and a full width at half maximum (FWHM) of about 20 nm. Such a spectrum is characteristic of red light that would be emitted from an LED that produces the light. FIG. 4 is a schematic diagram of a spectrum of light 400 emitted from a light source that includes an LED and a pumped light source (e.g., a phosphor material) that absorbs the narrowband light from the LED and emits another, typically broader, spectrum of light. In particular, FIG. 4 shows the spectrum of light after light emitted from an LED has passed through a phosphor material that absorbs some of the light from the LED and converts the absorbed light into light that is emitted from the phosphor material with a longer wavelength than the light emitted from the LED. The spectrum is represented by a curve 402 showing the relative emission intensity of light as a function of wavelength of the emitted light. Inorganic phosphor materials, as well as organic phosphor materials, can be used as the phosphor of the pumped light source. Quantum dot semiconductor material, i.e., nanometer-size bits of semiconductor material, such as cadmium selenide, that fluoresce when excited by photons also can be used as the pumped light source. By selecting the particular materials and size of the quantum dot material, the wavelength of light emitted from the quantum dot material can be precisely tuned over a narrow range of wavelengths. In general, a quantum dot that is approximately two nanometers in diameter emits blue light, a four nanometer diameter dot emits green light, and a six nanometer diameter dot emits red light.

In the example shown in FIG. 4 the spectrum 402 has a first peak emission wavelength of about 450 nm, where the first peak has a full width at FWHM bandwidth of about 20 nm. Such a peak in the spectrum 402 is characteristic of blue light that would be emitted from an LED and which would pass though the phosphor material without being absorbed and re-emitted by the phosphor material. The example spectrum 402 also has a second peak emission wavelength of about 550 nm, where the second peak has a full width at FWHM bandwidth of about 100 nm. Such a peak in the spectrum is characteristic of green light that would be emitted from the phosphor material after the blue light from the LED had been absorbed by the phosphor material and re-emitted by the phosphor material as green light. The LED-characteristic spectrum and the phosphor-characteristic spectrum that are shown in FIG. 4 overlap, such that the relative emission intensity does not go to zero between the peaks. However, in other implementations the spectrum of the LED light and the spectrum of the pumped light source need not overlap.

Figure 5:
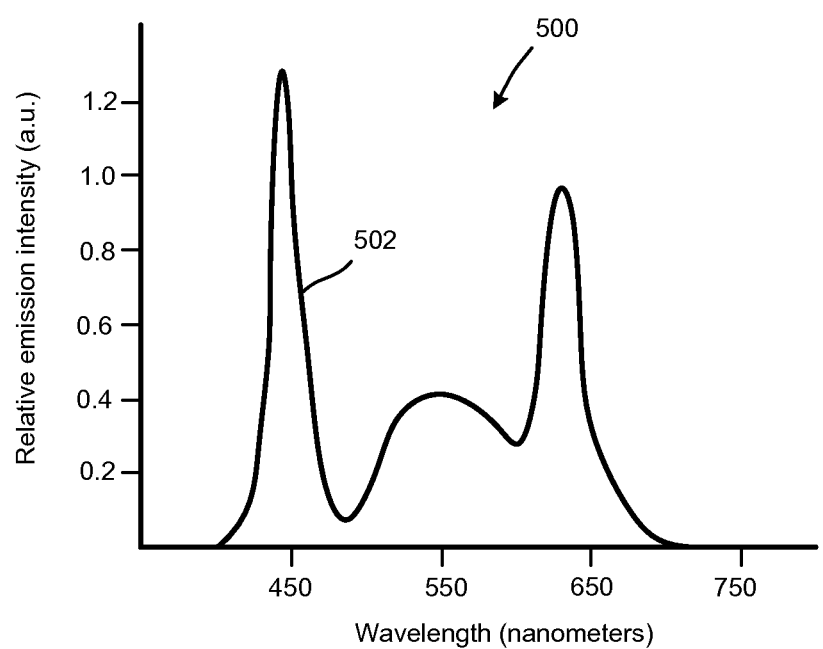
FIG. 5 is a schematic diagram of a spectrum of light emitted from a combination of the two light sources whose spectra are shown in FIG. 3 and FIG. 4.

FIG. 5 is a schematic diagram of a spectrum of light 500 emitted from a combination of the two light sources whose spectra are represented by curves 302 and 402 in FIG. 3 and FIG. 4, respectively. The spectrum of the combination of light is represented by a curve 502 showing the relative emission intensity of light as a function of wavelength of the emitted light. In the example shown in FIG. 5 the spectrum 502 has a first peak emission wavelength of about 450 nm, where the first peak has a full width at FWHM bandwidth of about 20 nm, a second peak emission wavelength of about 550 nm, where the second peak has a full width at FWHM bandwidth of about 80 nm, and a third peak emission wavelength of about 630 nm, where the second peak has a full width at FWHM bandwidth of about 25 nm. The first peak corresponds to the blue light emitted from the blue LED of the second light source. The second peak corresponds to the green light emitted from the phosphor material of the second light source. The third peak corresponds to the red light from the emitted from the red LED of the first light source.

By controlling the peak emission wavelengths, spectral bandwidths, and relative emission intensities of the first, second, and third peaks the overall shape of the curve 502 can be controlled, such that the light emitted from the combination of the first and second light sources has a desired chromaticity coordinate that is appropriate for a particular use. For example, when used as a light source 106 for a backlit display the chromaticity coordinate of the combination of the two light sources can be chosen to be close to some standard white point. The overall shape of the curve 502 can be determined by controlling the physical properties of the different LEDs and the phosphor in the first and second light sources and by controlling the relative amount of external power supplied to the different LEDs. For example, the relative heights of the first peak at 450 nm and the third peak at 630 nm can be controlled by controlling the relative amount of power (e.g., electrical current) supplied to the LEDs of the first and second light sources. It is understood that the wavelength and FWHM bandwidth parameter values detailed herein are for illustrative purposes only, and that implementations using other wavelengths and bandwidth values are also contemplated. In particular, white light can be created from two different LEDs that have different peak emission wavelengths than described herein and from a phosphor material or other pumped light source (e.g., a quantum dot material) that emits light with a different peak emission wavelength and FWHM bandwidth than described herein. Generally, spectra of light emitted from an LED have a FWHM bandwidth of less than about 40 nm and the spectra of light emitted from a phosphor material have a FWHM bandwidth of greater than about 80 nm.

Figure 6:
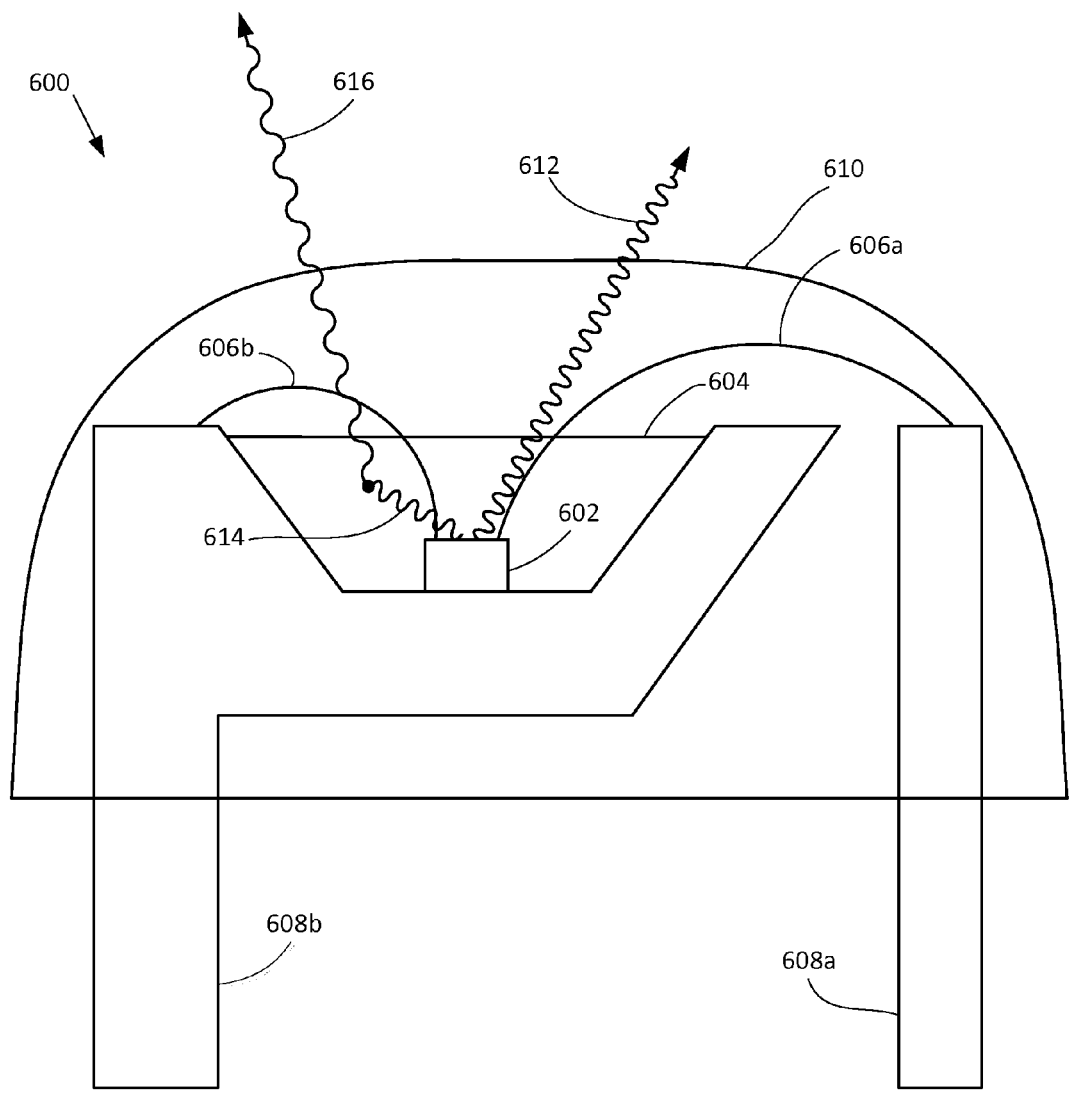
FIG. 6 is a schematic diagram of a light source that includes an LED and a phosphor material.

FIG. 6 is a schematic diagram of a light source 600 that includes an LED 602 and a phosphor material 604. The LED 602 receives electrical current through bond wires 606a and 606b that are, in turn, connected to electrical contacts 608a and 608b. The LED 602 and phosphor material 604 can be encapsulated by an encapsulation material 610. In some implementations, encapsulation material can focus the light emitted by the LED and the phosphor material in a desired direction.

The electrical power supplied to the LED 602 is converted into light that is emitted from the LED 602 and which generally has a FWHM bandwidth of less than about 40 nm. The light emitted from the LED 602 is emitted outward from the LED into the phosphor material, and some of the emitted light passes through the phosphor material 604 without being absorbed by the phosphor material 604. An example path 612 of a photon of such light is shown, where a wavy line is used to indicate a relative wavelength of the photon. Some light emitted by the LED 602 is absorbed by the phosphor material and is converted into light that is then emitted from the phosphor material. An example path 614 of a photon of light that is emitted from the LED and then is absorbed is shown. An example path 616 of a photon of light that is emitted from the phosphor material 604 after a photon from the LED 602 has been absorbed is shown. The light emitted from the phosphor material 604 has a longer wavelength than the light that is emitted from the LED 602 and generally has a FWHM bandwidth of greater than about 80 nm.

Although the phosphor material 604 is shown in FIG. 6 as encapsulating the LED 602, the phosphor material may be located elsewhere as well. For example, the phosphor material 604 can be placed directly on the emitting surface of the LED 602, or the phosphor material 604 can be disposed remotely from the LED 602 in the encapsulation material 610. In another implementation the phosphor material 604 can be disposed in elements of the LCD device 100, such as, for example, in the LGP 104 or in the diffuser 108.

Figure 7A:
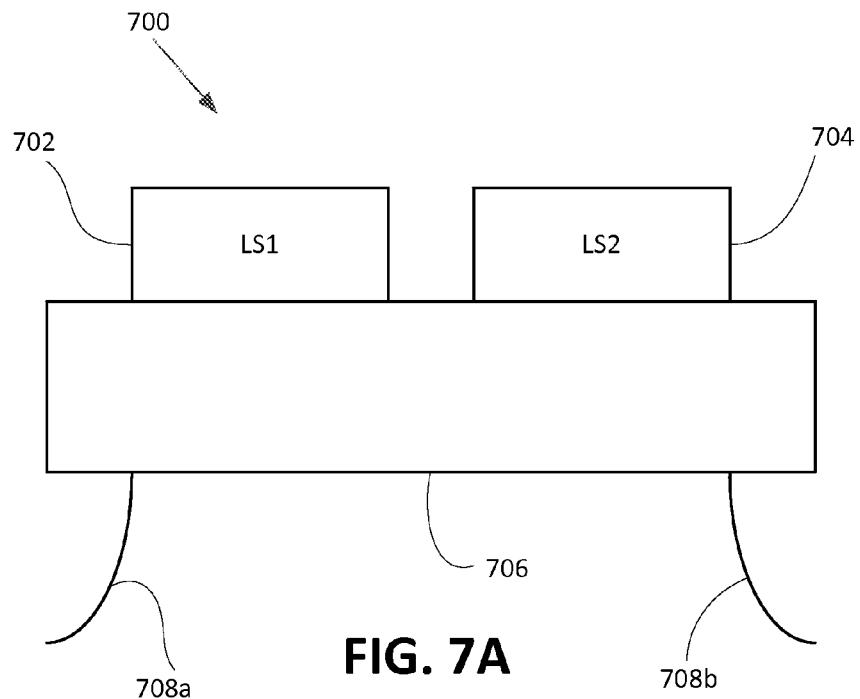
FIG. 7 is a schematic diagram of white light source having two different LEDs with different emission spectra.
Figure 7B:
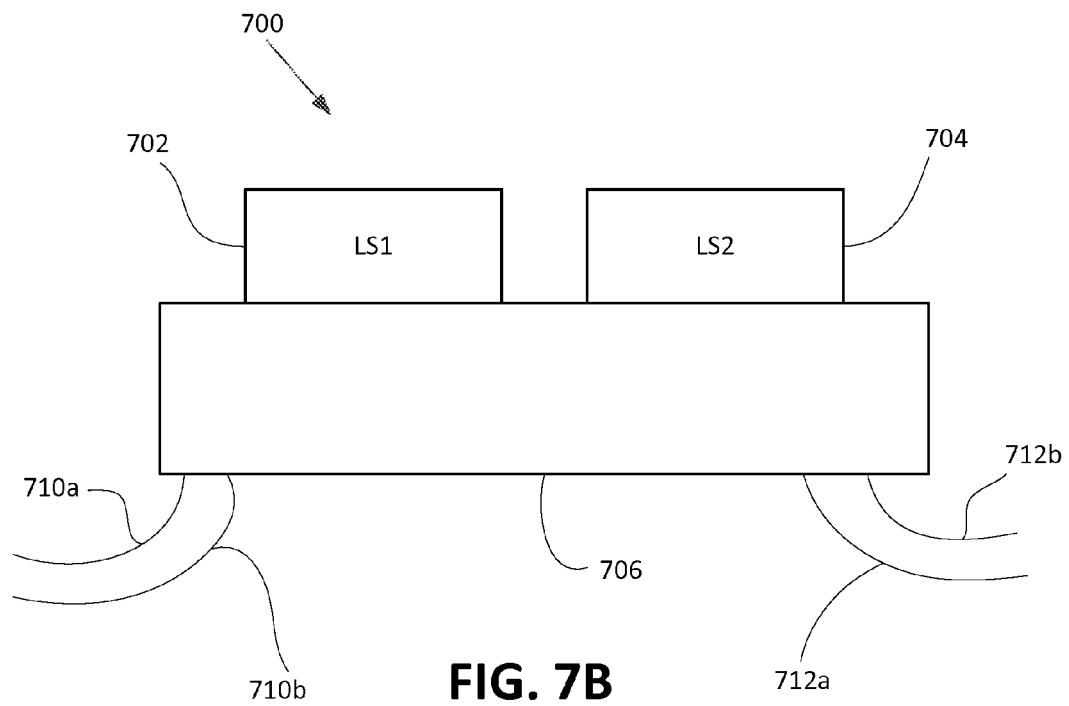

FIG. 7A is a schematic diagram of a white light source having two different LEDs with different emission spectra. The light sources 702 and 704 each include an LED, and one or both light sources also include a phosphor material that absorbs light from the LED of the light source and coverts the absorbed light into light having a longer wavelength than the light from the LED. The light sources 702 and 704 may be mounted on a substrate 706 and receive power from electrical connectors 708*a* and 708*b*. FIG. 7B is a schematic diagram of another implementation of a white light source having two different LEDs with different emission spectra. In the implementation of FIG. 7B, the light sources 702 and 704 have their own independent electrical connectors 710*a*, 710*b* and 712*a*, 712*b*, so that the light sources 702 and 704 can be powered separately. In the implementation of FIG. 7B, the light sources 702 and 704 may be mounted on the same substrate or on different substrates.

When the two light sources 702 and 704 receive electrical power from the same electrical connectors 708*a* and 708*b*, the relative amount of electrical power supplied to each light source 702 and 704, and hence the relative heights of the peak emission intensities for the spectra emitted by the different light sources, may be passively controlled by defining an appropriate electrical circuit between the two light sources 702 and 704 when the light sources are mounted on the substrate 706. In such an implementation, the relative amount of current applied to each light source 702, 704 can be relatively equal, e.g., when the LEDs of the two light sources 702, 704 are connected in series, or resistance can be added in parallel with one LED light source, so that different amounts of current are supplied to the different LED light sources. Such resistance can be in the form of a resistor that could be trimmed (e.g., by a laser) to control the relative amount of current supplied to each LED. In another implementation, the relative amount of power supplied to the LEDs of the respective light sources 702, 704 can be unequal if the LEDs of the of the respective light sources 702, 704 are connected in parallel, and resistors in the parallel legs of the circuit are trimmed (e.g., by a laser) to control the relative amount of current supplied to the different LEDs.

As shown in FIG. 7B, the two light sources 702 and 704 receive electrical power from different electrical connectors 710*a*, 710*b* and 712*a*, 712*b*. For example, light source 702 can receive power from electrical connectors 710*a*, 710*b*, and light source 704 can receive power from electrical connectors 712*a*, 712*b*. In such a configuration the relative amount of electrical power supplied to each light source 702 and 704, and hence the relative heights of the peak emission intensities for the spectra emitted by the different light sources, may be controlled actively by an external controller to control the amount of electrical power supplied to the LEDs of each of the two light sources 702 and 704.

Figure 8:
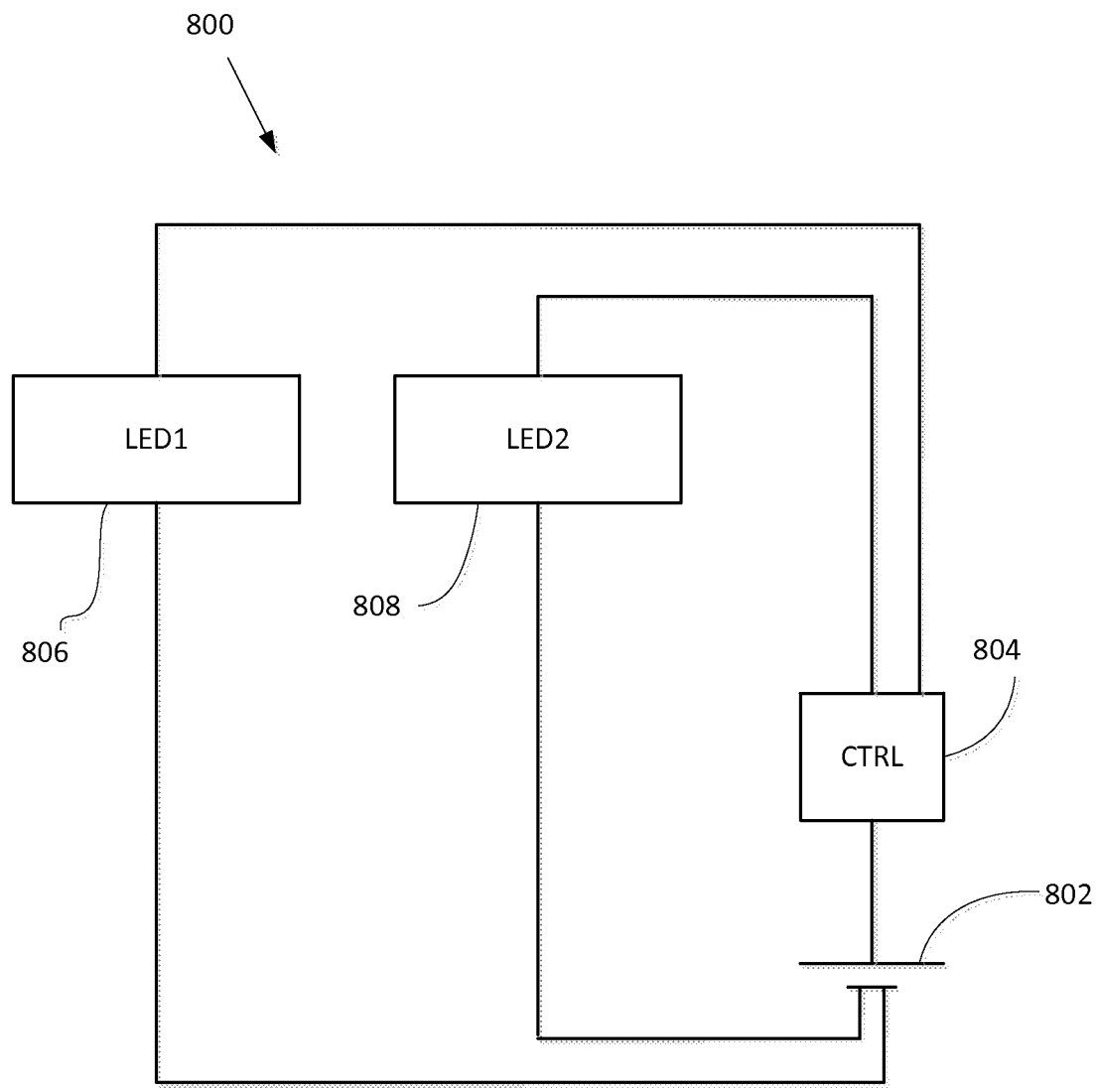
FIG. 8 is a schematic diagram of a controller for controlling the combined emission spectrum emitted from the light source of FIG. 7.

FIG. 8 is a schematic diagram of a controller 800 for controlling the combined emission spectrum emitted from the light source of FIG. 7. The controller includes a power source 802 and control circuitry 804 for controlling the amount of power that is supplied to a first LED light source 806 and to a second light source LED 808, where at least one of the light sources includes phosphor material that absorbs LED light and emits light having a longer wavelength than the absorbed LED light. The control circuitry 804 can include circuitry to vary the amount of steady-state current that is supplied to each LED 806 and 808. By controlling the relative amount of power supplied to each of the different LEDs 806 and 808, the chromaticity coordinate of the combined spectrum of the two light sources can be varied and controlled.

Actively controlling the relative amount of power supplied to each LED light source 806 and 808 to control the chromaticity coordinate of the combined output of the two sources 806 and 808 can be advantageous because the tolerances on the performance parameters of the sources 806 and 808 can be relatively relaxed when choosing individual sources 806 and 808 to use to produce a white light source 106. In other words, because controlling the relative amount of power supplied to each LED light source 806, 806 can be used to shift the chromaticity coordinate of the combined output of the two sources 806 and 808, when choosing many individual devices to use in one or more products, each source 806 need not perform exactly like every other source 806, and each source 808 need not perform exactly like every other source 808, since the active control of the power input to the sources can compensate somewhat for performance deviations in the individual devices.

As shown in FIG. 2, a plurality of white light sources 106 can be disposed proximate to an edge of the light guide panel. Each of the light sources 106 can include a first LED light source 806 and a second light source LED 808, where at least one of the light sources includes phosphor material that absorbs LED light and emits light having a longer wavelength than the absorbed LED light. In one implementation, the electrical power supplied to each individual light source 806 and 808 can be controlled independently so the chromaticity coordinates of both the individual light sources 106 and the chromaticity coordinate of the combined spectrum due to all the light sources 106 can be controlled. In another implementation, the electrical power supplied to a plurality of individual light sources 806 can be controlled together, while the electrical power supplied to a plurality of individual light sources 808 also can be controlled together but independently of the control of the light sources 806. In this manner, the chromaticity coordinates of the individual light sources 106 and the chromaticity coordinate of the combined spectrum due to all the light sources 106 can be controlled, although it may not be possible to make the chromaticity coordinate of all the light sources 106 identical.

Various combinations of light sources can be used to produce a white light source 106 from the combined spectra of a first light source 806 and a second light source 808. In one implementation, the white light source 106 includes a red LED and a blue LED with phosphor material that absorbs some of the blue light and emits green light. In particular, in this implementation, the first light source 806 can include an LED having a peak emission wavelength of greater than 610 nm, and the second light source 808 can include an LED having a peak emission wavelength of less than 480 nm and a phosphor material that absorbs a portion of sub-480 nm light and converts the absorbed light into light having a peak emission wavelength of between 500 nm and 570 nm.

In another implementation, the white light source 106 includes a green LED and a blue LED with phosphor material that absorbs some of the blue light and emits red light. In particular, in this implementation, the first light source 806 can include an LED having a peak emission wavelength of between 500 nm and 570 nm, and the second light source 808 can include an LED having a peak emission wavelength of less than 480 nm and a phosphor material that absorbs a portion of sub-480 nm light and converts the absorbed light into light having a peak emission wavelength of greater than 610 nm.

In another implementation, the white light source 106 includes a green LED with phosphor material that absorbs some of the green light and emits yellow light and a blue LED with phosphor material that absorbs some of the blue light and emits red light. In particular, in this implementation, the first light source 806 can include an LED having a peak emission wavelength of between 500 nm and 570 nm, and a phosphor material that absorbs light emitted by the LED and converts the absorbed light into light having a peak emission wavelength of between 570 and 590 nm. The second light source 808 can include an LED having a peak emission wavelength of less than 480 nm and a phosphor material that absorbs a portion of sub-480 nm light and converts the absorbed light into light having a peak emission wavelength of greater than 610 nm. In such an implementation, the spectrum of light emitted from the first light source may not resolve the peak between 500-570 nm due to the light emitted from the LED and the peak between 570-590 nm due to light emitted from the LED that is absorbed by the phosphor and converted to longer wavelength light because the peaks are relatively close together compared to their bandwidths.

In another implementation, the white light source 106 includes a yellow LED with phosphor material that absorbs some of the yellow light and emits red light and a blue LED with phosphor material that absorbs some of the blue light and emits green light. In particular, in this implementation, the first light source 806 can include an LED having a peak emission wavelength of between 570 nm and 590 nm, and a phosphor material that absorbs light emitted by the LED and converts the absorbed light into light having a peak emission wavelength of greater than 610 nm. The second light source 808 can include an LED having a peak emission wavelength of less than 480 nm and a phosphor material that absorbs a portion of sub-480 nm light and converts the absorbed light into light having a peak emission wavelength of between 500 nm and 570 nm.

Figure 9A:
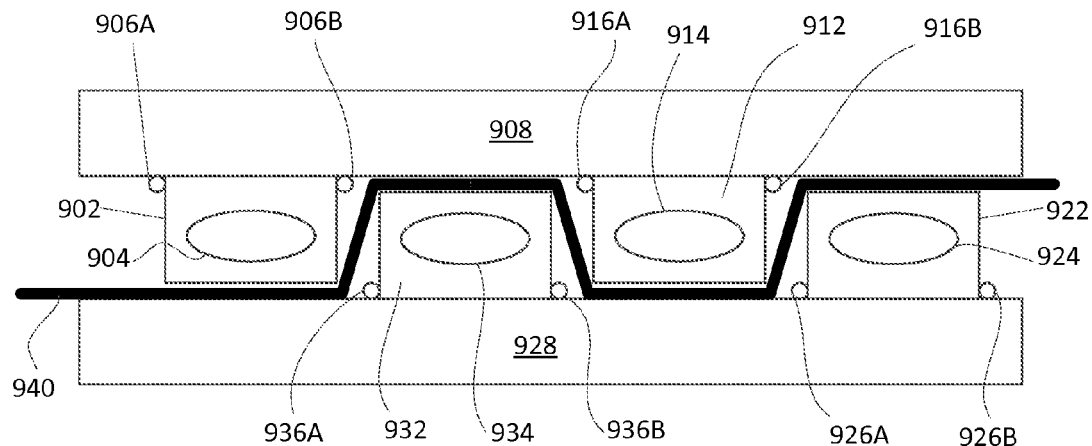
FIG. 9A is a schematic diagram of four interleaved light emitting diode light sources.

When different light sources having different spectra are used to create white light, the different light sources can be mounted proximate to an edge of the light guide panel in an interleaved manner. FIG. 9A is a schematic diagram of four interleaved LED light sources. Each LED light source includes a region of semiconductor materials (shown by the ovals) from which light is emitted, e.g., out of the page as seen in FIG. 9A and at least two electrical contacts (shown by the small circles), and is mounted on a PCB. One or more of the LED light sources 902, 912, 922, 932 can also have some of the light emitted from the LED of the LED light source absorbed by a phosphor material which then converts the absorbed light into light emitted from the phosphor material having a longer wavelength than the absorbed light.

Electrical contacts supply electrical power to the LED light sources, so that the semiconductor material can convert the electrical power into light that is emitted from the LED light source. For example, LED light source 902 includes electrical contacts 906A and 906B for providing electrical power to the LED light source, which then emits light from region 904. The LED light source 902 is mounted on PCB 908. LED light source 912 emits light from region 914 and has electrical contacts 916A and 916B. The LED light source 912 is mounted on PCB 908. LED light source 922 emits light from region 924 and has electrical contacts 926A and 926B. The LED light source 922 is mounted on PCB 928. LED light source 932 emits light from region 934 and has electrical contacts 936A and 936B. The LED light source 932 is mounted on PCB 928. An insulating material 940 optionally may be placed between the LED light sources 902, 912 on PCB 908 and the LED light sources 922, 932 on PCB 928.

The interleaved LED light sources 902, 912, 922, and 932 can be LED light sources having different spectra, such as described above. For example, LED light sources 902, 912 can have similar or identical spectra, LED light sources 922, 932 can have similar or identical spectra, which are different from the spectral of LED light sources 902, 912. In this manner the combined spectra of adjacent different LED light sources can produce white light. Many more than four LED light sources can be arranged in an interleaved "A-B-A-B" manner like this to produce white light over a long distance, where "A" indicates an LED light source having a first spectrum and "B" indicates an LED light sources having a second spectrum different from the first spectrum. For example, a plurality of LED light sources can be arranged in an interleaved "A-B-A-B" etc. manner along an edge of a light guide panel 104 to provide white light to a backlight display.

In other implementations, a display device can include interleaved LED light sources having three or more different spectra. For example, the display device could include LED light sources having a red peak emission intensity, different LED light sources having a green peak emission intensity, different LED light sources having a yellow peak emission intensity and different LED light sources having a blue peak emission intensity, where the combination of the spectra emitted from the multiple different kinds of LED light sources creates white light. Other combinations of different color spectra are also possible for creating white light, e.g., cyan, yellow, and magenta. As described above, the combined spectra of adjacent different LED light sources can produce white light also when more than two different kinds of light sources having different spectra are used. Thus, LED light sources can be arranged in an interleaved "A-B-C-A-B-C" manner or in an interleaved "A-B-C-D-A-B-C-D" manner to produce white light over a long distance, where "A" indicates LED light sources having a first spectrum and "B" indicates an LED light sources having a second spectrum different from the first spectrum, "C" indicates LED light sources having a third spectrum different from the first and second spectra, and "D" indicates LED light sources having a fourth spectrum different from the first, second, and third spectra.

An advantage of configuring multiple LED light sources in an interleaved manner as shown in FIG. 9A is that the density of LED light sources per unit length along a PCB 908 or 928 can be higher than if LED light sources were mounted on just one PCB. When LED light sources are mounted on a single PCB they must be spaced far enough apart, so that adjacent contacts on the single PCB do not come into contact and cause a short circuit. However, when LED light sources are mounted on opposing PCBs 908, 928 adjacent LED light sources can be placed closer together because adjacent electrical contacts (e.g., 906B and 936A, 936B and 916A, 916B and 926A) are not as likely to short circuit. In addition, a thin insulating film 940, which may include, for example, Polyethylene terephthalate (PET) or biaxially-oriented PET, can be placed between adjacent LEDs to further prevent the probability of a short circuit. In some implementations, the voltage of adjacent electrical contacts can be similar or identical to further reduce the possibility of, or the damage due to, short circuits between adjacent electrical contacts. For example, for white LED light sources having a supply voltage of 3-4 volts, electrical contacts 906A, 936B, 916A, 926B can be held at the supply voltage, while electrical contacts 906B, 936A, 916B, 926A can be held at ground to minimize hazard if a short circuit occurs.

Figure 9B:
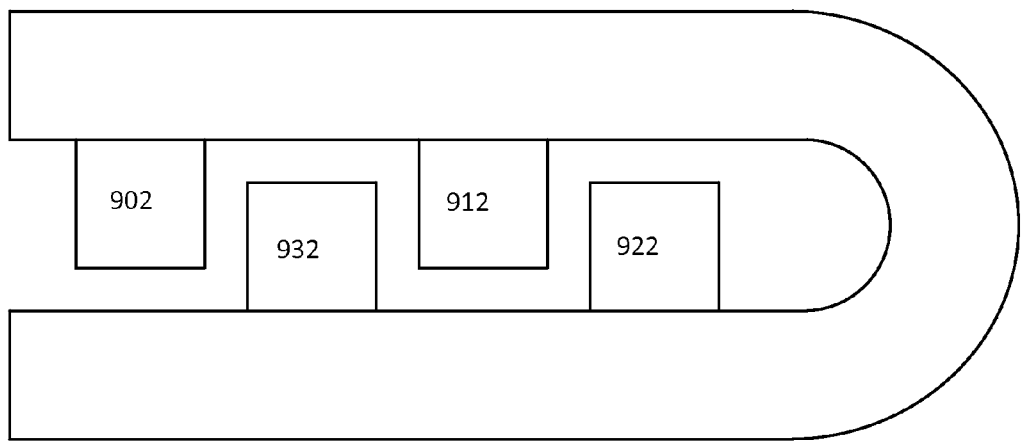
FIG. 9B is another schematic diagram of four interleaved light emitting diode light sources.

The PCBs 908, 928 on which the LED light sources are mounted can be separate and distinct PCBs or they can be a single board that is folded so that the different LED light sources are positioned in the interleaved configuration shown in FIG. 9B. For example, PCBs 908 and 928 can be portions of the same sheet of material that is folded into a "U" shape, where the curved part of the "U" is either to the right or left of the PCBs seen in FIG. 9A. In another implementation the curved part of the "U" could be located into, or out of the page, as seen from the perspective of FIG. 9A.

The interleaved configuration of multiple LED light sources shown in FIG. 9 also helps to reduce "hot spots" of intensity variation on the display due to non-uniform distribution of light that is coupled from the LGP 104, through the diffuser 108, and up to a surface of the display. For example, referring again to FIG. 2, at the edge of the diffuser 108 closest to the light sources 106, the intensity of light transferred through regions of the diffuser 108 directly above individual light sources 106 can be greater than the intensity of light transferred through regions of the diffuser 108 between individual light sources 106. In the interleaved configuration, individual LEDs can be closer together so that the light entering the LGP 104 from the sources 106 is more uniformly distributed and therefore the light emitted from the edge of the diffuser nearest the light sources will have lower spatial variations in the intensity of the light. Furthermore, when the spectra of different LED light sources are combined to create white light, the ability to place the different LED light sources close together allows light from the different spectra to mix efficiently, so that the color of the combined spectra is uniform over the surface of the display even close to an edge of the LGP 104. This allows the edge of the LGP 104 to be closer to the active pixels without producing hot spots at the edge of the display, which in-turn can allow for a narrower bezel in the display device.

Figure 10A:
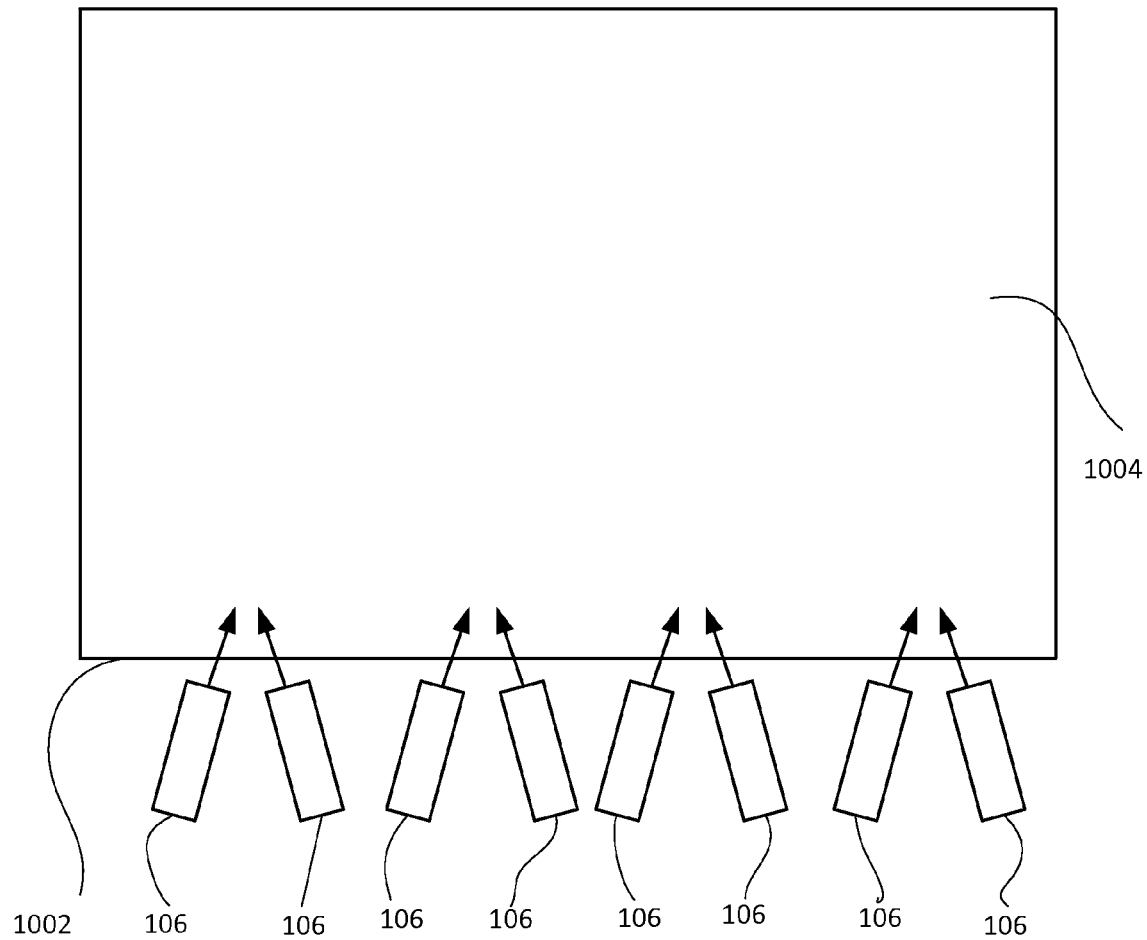
FIG. 10A is a top view of a light guide panel along with multiple light emitting diode light sources positioned near an edge of the light guide panel.

FIG. 10A is a top view of a light guide panel 1004 along with multiple LED light sources 106 positioned near an edge 1002 of the LGP 1004. The LED light sources 106 can be positioned such that the primary axes at which light is emitted from the LED light sources is not perpendicular to the edge 1002 of the LGP 1004. In some implementations, the primary axes can form angles of greater than about plus or minus one degree to the direction perpendicular to the edge 1002. In some implementations, the primary axes can form angles of greater than about plus or minus two degrees to the direction perpendicular to the edge 1002. In some implementations, the primary axes can form angles of greater than about plus or minus three degrees to the direction perpendicular to the edge 1002. In some implementations, the primary axes can form angles of greater than about plus or minus four degrees to the direction perpendicular to the edge 1002. In some implementations, the primary axes can form angles of greater than about plus or minus five degrees to the direction perpendicular to the edge 1002. In some implementations, the primary axes can form angles of greater than about plus or minus seven degrees to the direction perpendicular to the edge 1002.

In some implementations, the primary axes can form angles of greater than about plus or minus ten degrees to the direction perpendicular to the edge 1002. In some implementations, the primary axes can form angles of greater than about plus or minus fifteen degrees to the direction perpendicular to the edge 1002. The LED light sources 106 can be oriented so that their primary axes are all substantially parallel. In another implementation, as shown in FIG. 10A, the LED light sources 106 can be oriented such that some LED light sources have their primary axes oriented at positive angles to the perpendicular direction, while some LED light sources have their primary axes oriented at negative angles to the perpendicular direction. Light is emitted from the LED light sources 106 with an angular intensity profile in directions around the primary axis at which the LED light source is oriented. In some implementations the angular intensity profile is a Lambertian profile. Because of the angular intensity profile, light from an individual LED light source enters the LGP at a variety of angles, and the light from the multiple LED light sources 106 mixes in the LGP 1004 and then is coupled out of the diffuser (not shown) above the LGP with a substantially uniform intensity distribution along, and near, the edge 1002.

Figure 10B:
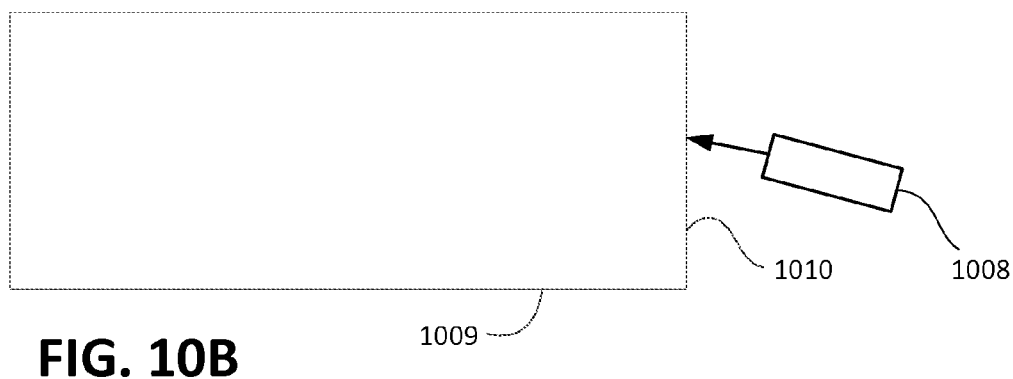
FIG. 10B is a side view of the light guide panel along with a light emitting diode light source positioned near an edge of the light guide panel.

FIG. 10B is a side view of a light guide panel 1009 along with an LED light source 1008 positioned near an edge 1010 of the LGP 1009. The LED light sources 1008 can be positioned such that the primary axis at which light is emitted from the LED light sources is not perpendicular to the edge 1010 of the LGP 1009 and is not parallel to the plane of the LGP 1009. In some implementations, the primary axis can form an angle of greater than about plus or minus one degree with the plane of the LGP 1009. In some implementations, the primary axis can form angles of greater than about plus or minus two degrees with the plane of the LGP 1009. In some implementations, the primary axis can form angles of greater than about plus or minus three degrees with the plane of the LGP 1009. In some implementations, the primary axis can form angles of greater than about plus or minus four degrees with the plane of the LGP 1009. In some implementations, the primary axis can form angles of greater than about plus or minus five degrees with the plane of the LGP 1009. In some implementations, the primary axis can form angles of greater than about plus or minus seven degrees with the plane of the LGP 1009. In some implementations, the primary axis can form angles of greater than about plus or minus ten degrees with the plane of the LGP 1009. In some implementations, the primary axis can form angles of greater than about plus or minus fifteen degrees with the plane of the LGP 1009.

The LED light source 1008 can be one of multiple LED light sources that are positioned near the edge 1010 of the LGP 1009 to inject light into the LGP. The multiple LED light sources can be oriented so that their primary axes are all substantially parallel to the primary axis of LED 1008. In another implementation, the multiple LEDs can be oriented such that some have their primary axis oriented at positive angles with respect to the plane of the LGP 1009, while some have their primary axis oriented at negative angles with respect to the plane of the LGP 1009. Light can be emitted from the LED light sources with an angular intensity profile in directions around the primary axis at which the LED light sources are oriented. In some implementations the angular intensity profile is a Lambertian profile. Because of the angular intensity profile, light from an individual LED light source enters the LGP at a variety of angles, and the light from the multiple LED light sources can mix in the LGP 1009 and then can coupled out of the diffuser (not shown) above the LGP with a substantially uniform intensity distribution along, and near, the edge 1010.

Figure 10C:
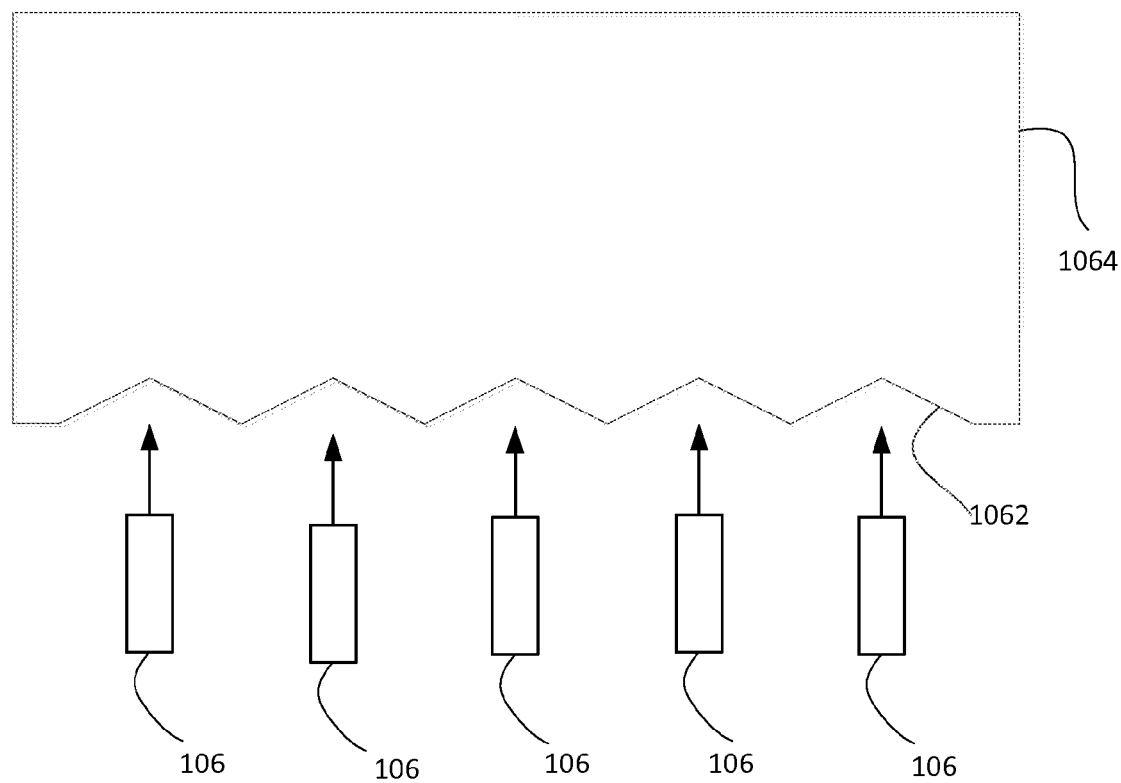
FIG. 10C is a top view of another version of the light guide panel along with multiple light emitting diode light sources positioned near an edge of the light guide panel.

FIG. 10C is a top view of another version of a light guide panel 1064 along with multiple LED light sources 106 positioned near an edge 1062 of the LGP 104. Unlike edge 1002, the edge 1062 is not straight. Instead, edge 1064 has portions that act as prisms to refract light from the LED light sources 106 when the light enters the LGP 1064. In this manner, multiple LED light sources 106 can have their primary axes parallel to each other in a direction that would be parallel to the edge 1062 if the edge 1062 were straight, as edge 1002 in FIG. 10A is straight. Then, light directed along the primary axis from the LED light sources 106 can be refracted slightly when it enters the LGP. The orientation of the LED light sources and their primary axes, the position of the LED light sources relative to the edge 1062 and the edge's individual features, and the features of the edge (e.g., the prismatic angles and the lengths of the features) can be selected to mix the light from multiple LED light sources to minimize hot spots near the edge 1062.

Figure 11A:
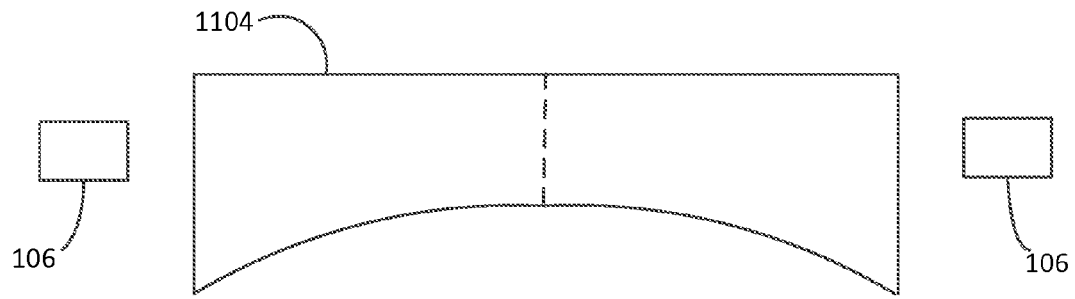
FIGS. 11A, 11B, and 11C are schematic side views of light guide panels having non-rectangular profiles along with light emitting diodes that supply light to the light guide panels.
Figure 11B:
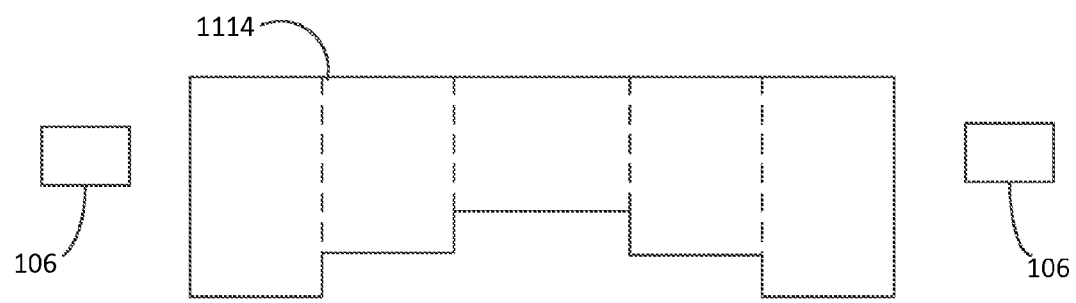
Figure 11C:
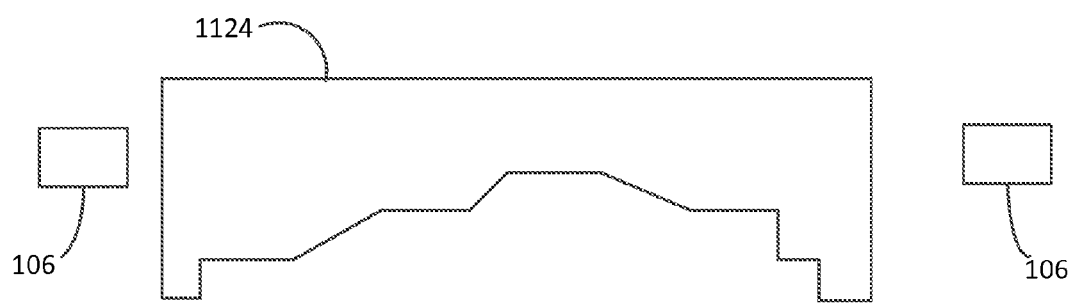

FIGS. 11A, 11B, and 11C are schematic side views of LGPs having non-rectangular profiles along with LED light sources 106 that supply light to the LGPs. The LGPs of FIGS. 11A, 11B, and 11C have ends closes to the LED light sources 106 that are thicker than the mid portions of the LGPs. The thicker ends promote efficient coupling of light from the LED light sources into the LGPs, while the thinner central portions allow space for accommodating components or for routing of cables. In FIG. 11A, the LGP 1104 has thicker ends and a thinner mid portion, and the thickness of the LGP 1104 varies continuously between the ends of the LGP. The LGP 1104 can be machined or molded from a single piece of material. In another implementation, the LGP 1104 can be created by bonding two pieces of material together (e.g., at the midpoint between the two ends of the LGP 1104), where the dashed line in FIG. 11A indicates an example location at which two pieces of material could be bonded together. In FIG. 11B, the LGP 1114 can have a thickness profile that varies stepwise between the ends of the LGP 1114. Such an LGP 1114 can be molded in a single piece in this form. In another implementation, the LGP 1114 can be fabricated from flat, rectangular stock pieces of material, where the dashed lines in FIG. 11B indicate example locations at which pieces of material could be bonded together. In FIG. 11C, the LGP 1124 can have a thickness profile that is not symmetric about a plane between the ends of the LGP 1124.

Referring again to FIG. 1, in some implementations the light source 106 can be mounted proximate to the back surface 105B of the LGP 104 rather than proximate to an edge surface 105A of the LGP. In such an implementation, multiple light sources 106 can be positioned behind the diffuser 108 and/or the LGP 104 (which may also act as a diffuser) and provide light to the LCD section 112 of the device 100. In such an implementation, the light sources can be referred to as back-mounted, rather than edge-mounted.

Figure 12:
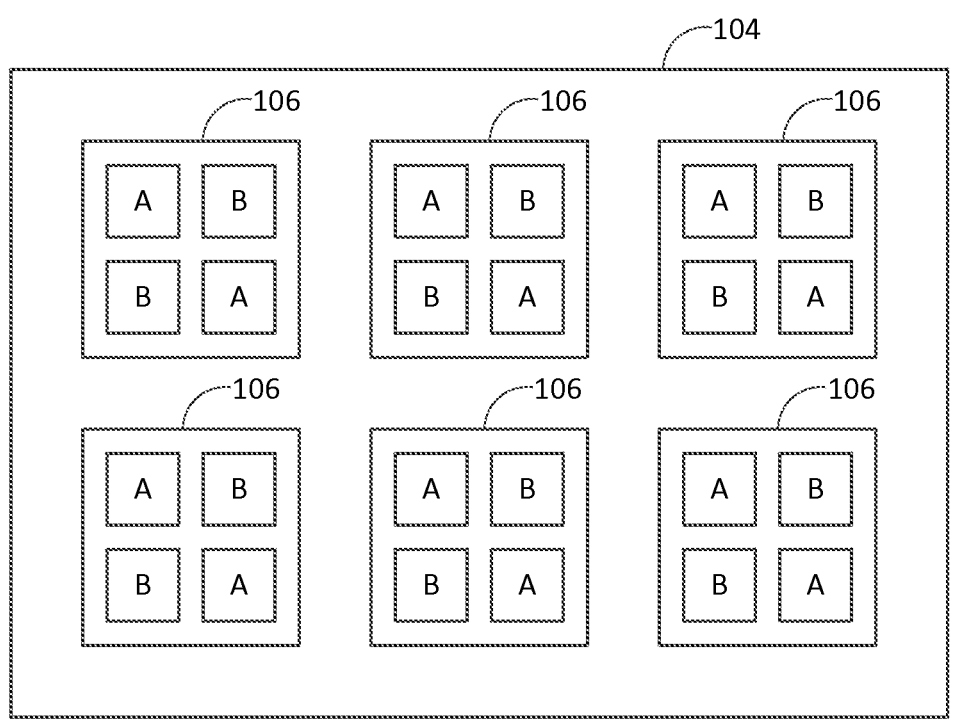
FIG. 12 is a schematic diagram of four interleaved light emitting diode light sources for use in as for a backlit display with back-mounted light sources.

FIG. 12 is a schematic diagram of a backlit display with back-mounted white light sources 106, where the white light sources 106 include individual colored LED light sources, which in combination produce the white light of the light source 106. The white light sources include at least one of the individual colored LED light sources, but can include more than one of the individual light sources. For example, as shown in FIG. 12, each light source 102 includes four individual light sources, where two sources are one kind of LED light source that produces a spectrum denoted by "A" and two sources are another kind of LED light source that produces a spectrum denoted by "B," which is different from the color denoted by "A." The individual sources are interleaved in a two-dimensional array of alternating first and second light sources in a manner similar to the one-dimensional interleaving shown in FIGS. 9A, 9B, so that their combine spectra produces white light, although the individual light sources usually would be mounted on a single PCB. The individual light sources of each white light source can be mounted on the PCB, such that they are uniformly spaced from each other across the PCB. In another implementation, different white light sources 106 can be spaced from each other, such that the distances between individual light sources of adjacent light sources 106 is different than the distances between the individual light sources within a light source 106.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., a FPGA or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A backlight for providing light to a computer-controlled display device, the backlight comprising:
a plurality of first light sources;
a plurality of second light sources; and a light guide panel (LGP) having at least one edge and a surface facing a display surface of the display device, the LGP being adapted for guiding light emitted by, and received from, the first and second light sources at one or more edges of the LGP to the surface of the LGP, wherein the first light sources include first light emitting diodes (LEDs) having a peak emission wavelength of between 500 nm and 570 nm, wherein the second light sources include second LEDs having a peak emission wavelength of less than 480 nm and phosphor material that absorbs a portion of light emitted from the second LEDs and converts the absorbed light into light emitted from the phosphor material having a peak emission wavelength greater than 610 nm.

2. The backlight of claim 1,
wherein the light received from the first light sources at an edge of the LGP has a full-width, half-maximum spectral bandwidth of less than about 25 nm, and
wherein the light received from the second light sources at an edge of the LGP has a full-width, half-maximum spectral bandwidth of greater than about 70 nm.

3. The backlight of claim 1, wherein the first and second light sources are located proximate to at least one edge of the light guide panel.

4. The backlight of claim 1, wherein the second LEDs are at least partially encapsulated by the phosphor material.

5. The backlight of claim 1, wherein at least one first light source is co-packaged with at least one second light source.

6. The backlight of claim 1, wherein the light guide panel includes at least some of the phosphor material that absorbs light emitted from the second LEDs and converts the absorbed light into the light emitted from the phosphor material having a peak emission wavelength greater than 610 nm.

7. The backlight of claim 1, further comprising:
a printed circuit board having a surface upon which a plurality of the first light sources are disposed and upon which a plurality of the second light sources are disposed,
wherein individual ones of the plurality of first light sources are disposed between individual ones of the plurality of second light sources.

8. The backlight of claim 1, further comprising:
a first printed circuit board having a first surface upon which a plurality of the first light sources are disposed; and
a second printed circuit board having a second surface upon which a plurality of the second light sources are disposed,
wherein the first surface and the second surface face each other, and
wherein individual ones of the plurality of first light sources are disposed between individual ones of the plurality of second light sources.

9. The backlight of claim 1,
wherein the light received from the first LEDs at the edge of the LGP has a FWHM bandwidth of less than about 40 nm,
wherein the light received from the second LEDs light sources at the edge of the LGP, which is not absorbed by the phosphor material has FWHM bandwidth of less than about 40 nm,
wherein the light received from the second LEDs light sources at the edge of the LGP, which is absorbed by the phosphor material and converted into light emitted from the phosphor material has FWHM bandwidth of greater than about than about 80 nm.

10. A backlight for providing light to a computer-controlled display device, the backlight comprising:
a plurality of first light sources;
a plurality of second light sources; and
a light guide panel (LGP) having at least one edge and a surface facing a display surface of the display device, the LGP being adapted for guiding light emitted by, and received from, the first and second light sources at one or more edges of the LGP to the surface of the LGP,
wherein the first light sources include first light emitting diodes (LEDs) having a peak emission wavelength of less than 480 nm and phosphor material that absorbs a portion of light emitted from the first LEDs and converts the absorbed light into light emitted from the phosphor material having a peak emission wavelength of between 500 nm and 570 nm, and
wherein the second light sources include second LEDs having a peak emission wavelength of less than 480 nm and phosphor material that absorbs a portion of light emitted from the second LEDs and converts the absorbed light into light emitted from the phosphor material having a peak emission wavelength greater than 610 nm.

11. The backlight of claim 10, wherein the first and second light sources are located proximate to at least one edge of the light guide panel.

12. The backlight of claim 10, wherein at least one first light source is co-packaged with at least one second light source.

13. The backlight of claim 10, wherein the light guide panel includes at least some of the phosphor material that absorbs light emitted from the second LEDs and converts the absorbed light into the light emitted from the phosphor material having a peak emission wavelength greater than 610 nm.

14. The backlight of claim 10, further comprising:
a printed circuit board having a surface upon which a plurality of the first light sources are disposed and upon which a plurality of the second light sources are disposed,
wherein individual ones of the plurality of first light sources are disposed between individual ones of the plurality of second light sources.

15. The backlight of claim 10, further comprising:
a first printed circuit board having a first surface upon which a plurality of the first light sources are disposed; and
a second printed circuit board having a second surface upon which a plurality of the second light sources are disposed,
wherein the first surface and the second surface face each other, and
wherein individual ones of the plurality of first light sources are disposed between individual ones of the plurality of second light sources.

16. A backlight for providing light to a computer-controlled display device, the backlight comprising:
a plurality of first light sources;
a plurality of second light sources; and
a light guide panel (LGP) having at least a first surface facing a display surface of the display device and a back surface opposite the first surface, the LGP being adapted for guiding light emitted by, and received from, the first and second light sources at the back surface of the LGP to the first surface of the LGP,
wherein the first light sources include first light emitting diodes (LEDs) having a first peak emission wavelength of between 500 nm and 590 nm and further include a phosphor material that absorbs a portion of light emitted from the first LEDs and converts the absorbed light into light emitted from the phosphor material having a second peak emission wavelength of greater than 570 nm, and wherein the first light sources are disposed proximate to the back surface of the LGP, and wherein the second light sources include second LEDs having a first peak emission wavelength of less than 480 nm and phosphor material that absorbs a portion of light emitted from the second LEDs and converts the absorbed light into light emitted from the phosphor material having a peak emission wavelength greater than 500 nm, and wherein the second light sources are disposed proximate to the back surface of the LGP.

17. The backlight of claim 16, wherein the first light sources and the second light sources are arranged in a two-dimensional array of alternating first and second light sources in both dimensions of the array.

18. The back light of claim 17, wherein the first and second light sources are equally spaced from each other in the array.

19. A backlight for providing light to a computer-controlled display device, the backlight comprising:
- a plurality of first light sources;
- a plurality of second light sources; and
- a light guide panel (LGP) having at least one edge and a surface facing a display surface of the display device, the LGP being adapted for guiding light emitted by, and received from, the first and second light sources at one or more edges of the LGP to the surface of the LGP,
- wherein the first light sources include first light emitting diodes (LEDs) having a peak emission wavelength of between 500 nm and 590 nm and further include a pumped light source that absorbs a portion of light emitted from the first LEDs and converts the absorbed light into light emitted from the pumped light source having a peak emission wavelength of greater than 570 nm, and
- wherein the second light sources include second LEDs having a first peak emission wavelength of less than 480 nm and a pumped light source that absorbs a portion of light emitted from the second LEDs and converts the absorbed light into light emitted from the pumped light source having a peak emission wavelength greater than 500 nm.

20. The backlight of claim 19, wherein the pumped light source includes a phosphor material.

21. The backlight of claim 19, wherein the pumped light source includes a quantum dot material.

22. The backlight of claim 21,
wherein the first LEDs have a peak emission wavelength of greater than 610 nm, and
wherein the quantum dot material absorbs a portion of light emitted from the second LEDs and converts the absorbed light into light emitted from the phosphor material having a peak emission wavelength of between 500 nm and 570 nm.

23. The backlight of claim 22, wherein a FWHM bandwidth of the pumped light source is less than 40 nm.

24. The backlight of claim 19,
wherein the first LEDs have a peak emission wavelength of between 500 nm and 570 nm and the light emitted from the pumped light sources of the first light sources has a peak emission wavelength of between 570 nm and 590 nm, and
wherein the light emitted from the pumped light sources of the second light sources has a peak emission wavelength of greater than 610 nm.

25. The backlight of claim 19,
wherein the first LEDs have a peak emission wavelength of between 500 nm and 570 nm and the light emitted from the pumped light sources of the first light sources has a peak emission wavelength of greater than 610 nm, and
wherein the light emitted from the pumped light sources of the second light sources has a peak emission wavelength of between 570 nm and 590 nm.

26. The backlight of claim 19,
wherein the first LEDs have a peak emission wavelength of between 570 nm and 590 nm and the light emitted from the pumped light sources of the first light sources has a peak emission wavelength of greater than 610 nm, and
wherein the light emitted from the pumped light sources of the second light sources has a peak emission wavelength of between 500 nm and 570 nm.

* * * * *